(12) United States Patent
Horie et al.

(10) Patent No.: US 6,384,607 B2
(45) Date of Patent: May 7, 2002

(54) BATTERY STATE SENSING APPARATUS

(75) Inventors: Hideaki Horie; Osamu Shimamura; Takaaki Abe, all of Kanagawa; Fumio Munakata, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/796,555

(22) Filed: Mar. 2, 2001

(30) Foreign Application Priority Data

Mar. 3, 2000 (JP) ........................................ 2000-058077
Mar. 3, 2000 (JP) ........................................ 2000-058078

(51) Int. Cl.[7] ............................................. G01N 27/416
(52) U.S. Cl. ...................................................... 324/427
(58) Field of Search ......................... 324/427; 320/162, 320/163, 164, 148, 134, 132, 136, 157

(56) References Cited

U.S. PATENT DOCUMENTS

6,136,471 A  10/2000 Yoshida et al. .......... 429/218.1
6,160,375 A  12/2000 Horie et al. ................. 320/116

*Primary Examiner*—Gregory Toatley
(74) *Attorney, Agent, or Firm*—Foley & Lardner (57) ABSTRACT

A voltage-responsive optical sensing device such as a semiconductor device of a light emitting device and/or liquid crystal device of a sensing apparatus for sensing an excessive charge and/or excessive discharge state of a battery, such as a lithium ion secondary battery is incorporated into an inside of a cell of a cell group to form the battery. For example, with electrodes of the liquid crystal device connected in parallel to the cell and a light beam of an external light source introduced into the liquid crystal device, a photo sensor senses a change in a light-transmissive characteristic of the liquid crystal device so that the state of the cell constituting the battery can be sensed.

26 Claims, 9 Drawing Sheets

EXAMPLE OF LAMINATED LAYER ELECTRODE
(CONSTITUTING A THIN FILM ELEMENT ON
AN ELECTRODE PLATE)

BATTERY STATE SENSING APPARATUS

BACKGROUND OF THE INVENTION a) Field of the Invention

The present invention relates to an apparatus for sensing a state of a battery such as charge and/or discharge state of the battery such as a lithium ion secondary battery.

b) Description of the Related Art

It is well known that the battery in an excessive charge/discharge state of the battery, e.g., the lithium ion secondary battery causes a deterioration of the battery so that a battery performance cannot be secured.

In addition, it is necessary to secure an intercellular balance in a lithium ion battery. Hence, if a group of cells to form the battery is manufactured, a, so-called, cell controller to make states of the respective cells of the battery (charge and discharge states) equal to each other is required.

SUMMARY OF THE INVENTION

However, a conventional cell controller requires a wide installation area with a large circuitry even if circuit parts are installed on electrodes of cell after the cell is manufactured.

A complicated wiring is needed to connect each cell to the cell controller and each cell has a mutually different potential. Hence, its circuit complexity is increased. In addition, it is difficult to install the circuit on laminated electrodes of such a bipolar cell or so forth.

Furthermore, the conventional cell controller consumes relatively largely a current in a sensing operation of, for example, discharge quantity.

There is a great possibility of accelerating a discharge of the battery in the discharge state. In this case, it is presumed that a battery performance cannot sufficiently be secured.

It is, hence, an object of the present invention to provide an apparatus for sensing a state of a battery in which a voltage-responsive optical sensing device such as a light emitting device, luminescent semiconductor micro-crystals and/or liquid crystal device to sense an excessive charge/discharge state of the battery can integrally and simply be installed into an inside of the battery without unnecessary wiring and the performance of battery can sufficiently be secured with less consumption of current.

According to one aspect of the present invention, there is provided an apparatus for sensing a state of a battery, the apparatus comprising: a voltage-responsive optical sensing device having an optical characteristic that changes in response to a variation in a voltage across positive and negative electrodes of a cell constituting the battery; and a state sensing system that senses a change in the optical characteristic of the voltage-responsive optical sensing device to sense the state of the battery.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
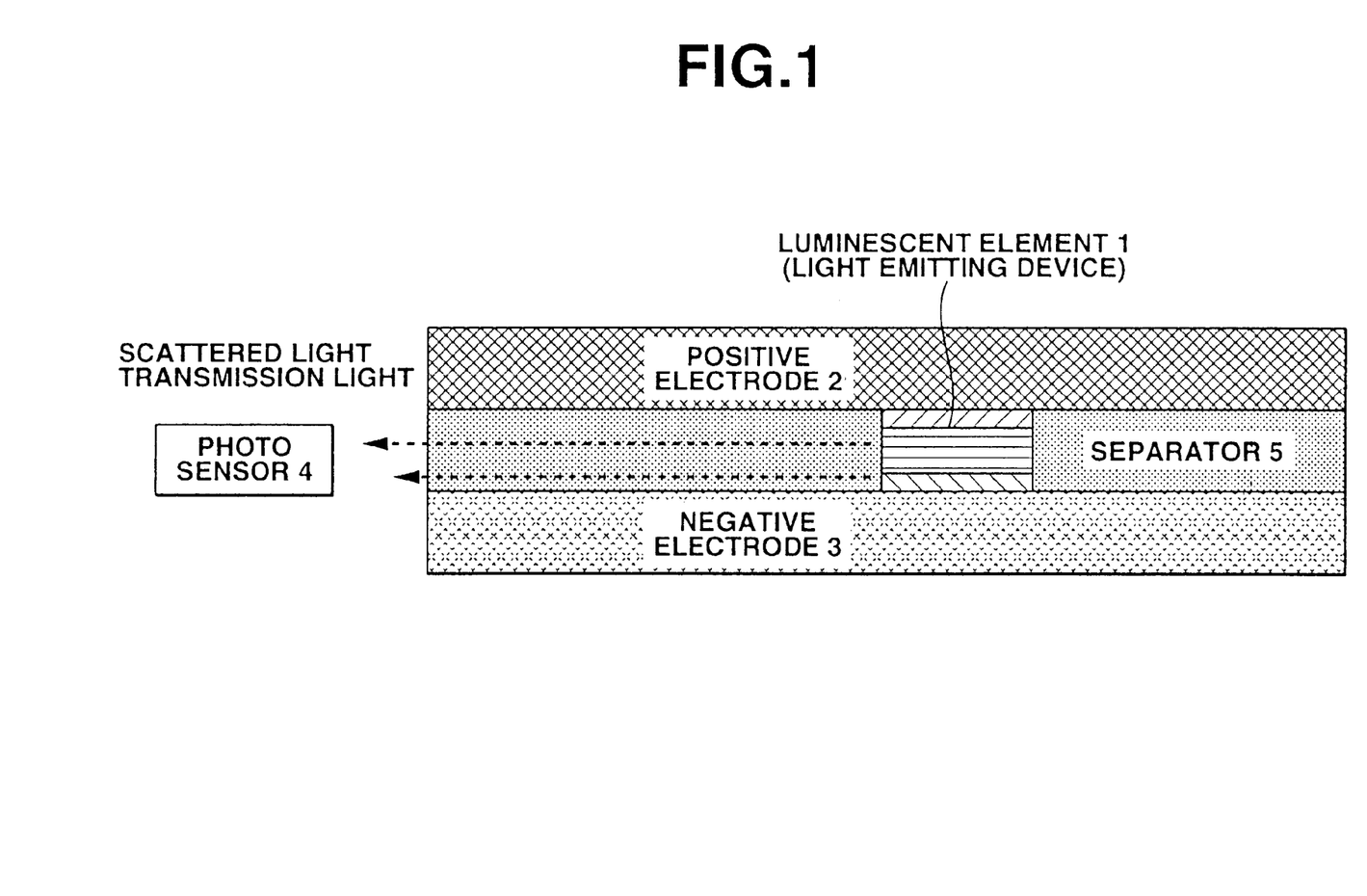
FIG. 1 is a schematic cross sectional view of a cell of a lithium ion secondary battery to which a battery state sensing apparatus in a first preferred embodiment according to the present invention is applicable.

FIG. 1 shows a first preferred embodiment of a battery state sensing apparatus according to the present invention.

The battery is constituted by a positive electrode 2, a negative electrode 3, and a separator 5.

A manufacturing method of the battery state sensing apparatus shown in FIG. 1 will be described below.

(1) A small hole is penetrated through the separator 5 as a through hole and a luminescent element, viz., a light emitting device 1 having a high solvent-resistant characteristic is disposed in the through hole of the separator 5 so that electrodes of the light emitting device 1 are exposed to both surfaces of the separator 5.

(2) Positive and negative electrodes 2 and 3 are applied to both surfaces of the separator 5 and both electrodes of the light emitting device 1 are respectively contacted on active materials of the electrodes 2 and 3.

(3) A light emitting start voltage of the light emitting device 1 is dependent upon a selection of materials of the battery in which the light emitting device is incorporated and upon a control design of the battery.

Hence, the light emitting device 1 is so structured as to emit a light beam when a full charge potential is reached which is prescribed in the battery system.

As described above, since, in the first embodiment, a small hole (so-called, a defect portion) is formed ion part of the separator 5 and the semiconductor light emitting device 1 is installed in an inner part of the separator 5, lead wires to connect the device 1 to the positive and negative electrodes 2 and 3 the lead wires to be connected to fixing portions of both electrodes of the battery, and a semiconductor device installation portion can be omitted.

Since the voltage-responsive optical sensing device can integrally be installed in the separator 5 between the positive and negative electrodes 2 and 3, a volumetric efficiency can remarkably be improved and a manufacturing cost can be reduced as compared with such a comparative example in which a sensor to sense the full charge of the battery is installed at an outside of the battery and connected in parallel to the battery. It is noted that, in FIG. 1, a photo sensor 4 to sense the light beam emitted from the light emitting device 1 is installed to face toward an end of the separator 5.

(Second Embodiment)

Figure 2:
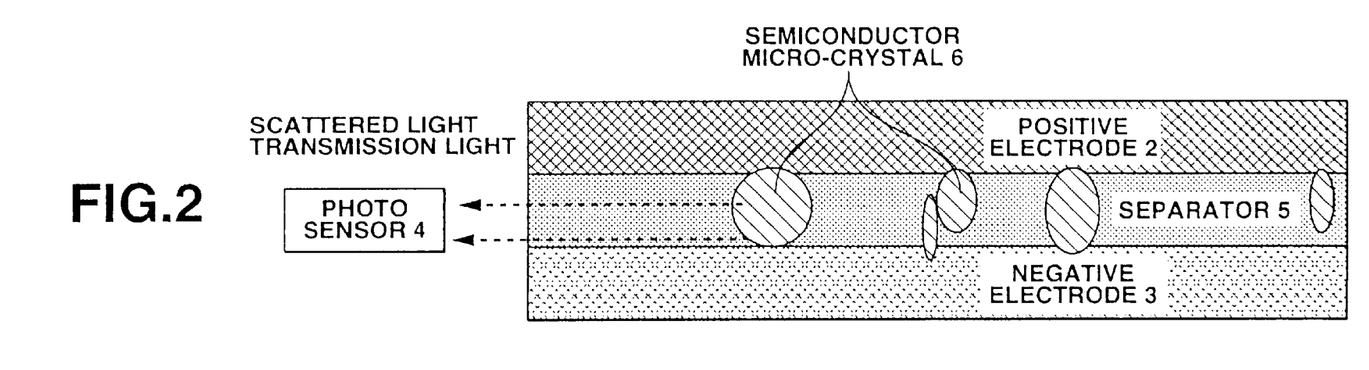
FIG. 2 is a schematic cross sectional view of a cell of a lithium ion secondary battery to which a battery state sensing apparatus in a second preferred embodiment according to the present invention is applicable.

FIG. 2 shows a second preferred embodiment of the apparatus for sensing the state of the battery according to the present invention.

The battery is constituted by the positive electrode 2, the negative electrode 3, and the separator 5.

The semiconductor micro-crystals 6 emits the light beams when a certain prescribed voltage is applied across the micro-crystals 6. The light emitting start voltage is dependent upon a physical property of a semiconductor material. The selections of a luminescent semiconductor material and battery are made so that the micro-crystals 6 emit the light beams when the battery voltage has reached to the full charge potential prescribed in the battery system.

It is not necessary to take a new circuit structure since, in the second embodiment, the semiconductor luminescent micro-crystals 6 are buried in the inner part of the separator 5. Therefore, the battery is constituted by the separator containing the semiconductor luminescent material. A battery system with a sensing function can integrally be constituted in an extremely simple manner.

Therefore, the lead wires to connect the device to the electrodes of the battery, the fixing portion on the electrodes of the battery to which the lead wires are connected, and the semiconductor device installation space can be omitted. This advantage in the second embodiment is generally the same as that described in the first embodiment.

It is noted that each of the luminescent semiconductor micro-crystals 6 is made of a nitride selected from a group consisting of GaN, AlN, and SiN. One of these nitride materials is used which exhibit a miniature light emitting device with the high solvent-resistant characteristic.

(Third Embodiment)

Figure 3:
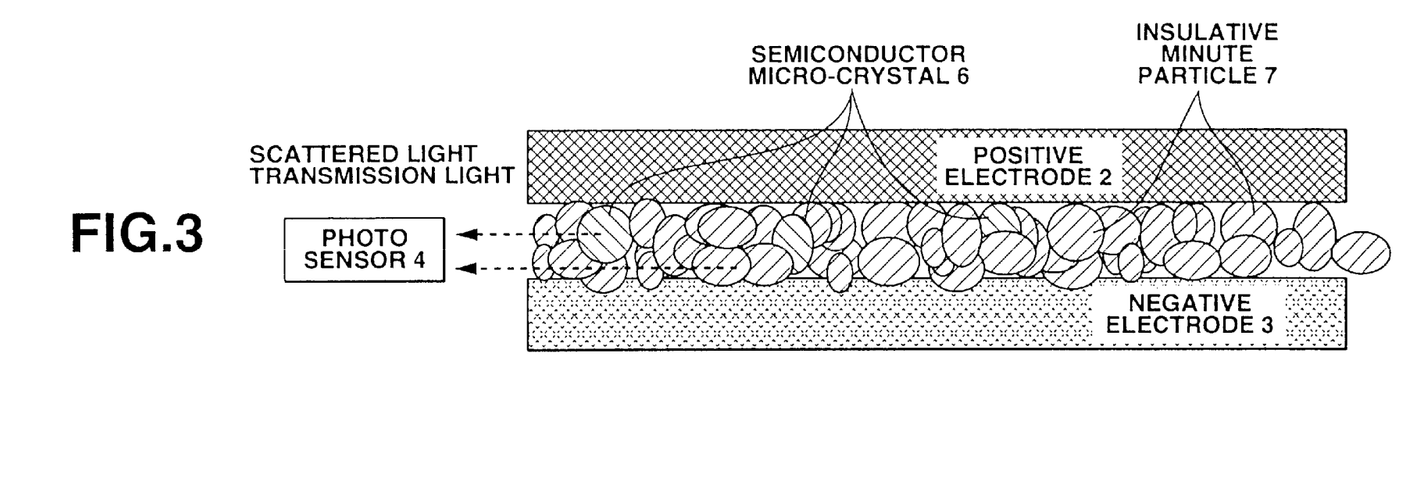
FIG. 3 is a schematic cross sectional view of a cell of a lithium ion secondary battery to which a battery state sensing apparatus in a third preferred embodiment according to the present invention is applicable.

FIG. 3 is a third preferred embodiment of the state sensing system of the battery including the positive electrode 2, the negative electrode 3, and the separator 5.

In the third embodiment, in place of using a porous film separator as described in the second embodiment, both insulative minute particles 7 and luminescent semiconductor micro-crystals 6 are blended.

A solid-state or gel ion conductor such as a highly molecular ion conductor may be used in place of a solvent electrolyte. The semiconductor micro-crystals 6 emit the light beams as in the same way as described in the second embodiment in a case where a certain prescribed voltage is applied to the micro-crystals 6.

The light emitting start voltage is dependent upon the semiconductor material physical property. The selections of the luminescent semiconductor material and cell are made to emit the light beams when the applied voltage has reached to the full charge potential prescribed in the battery system.

The advantages in the third embodiment are generally the same as those described in the second embodiment.

(Fourth Embodiment)

Figure 4A:
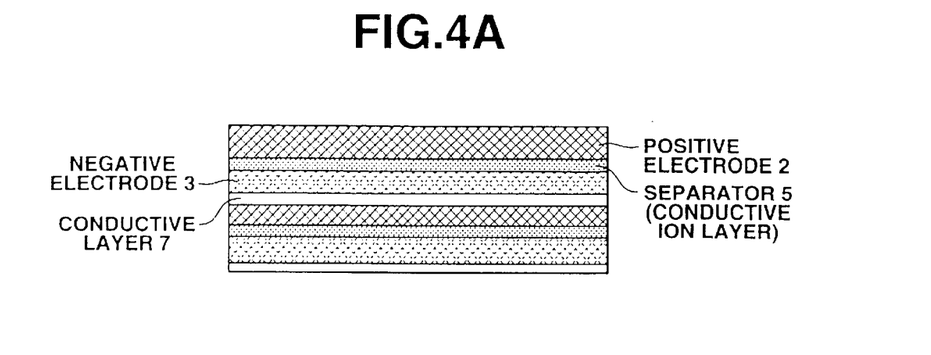
FIGS. 4A and 4B are schematic cross sectional view and perspective view of a laminated multi-cell secondary battery to which the battery state sensing apparatus in a fourth preferred embodiment according to the present invention is applicable.
Figure 4B:
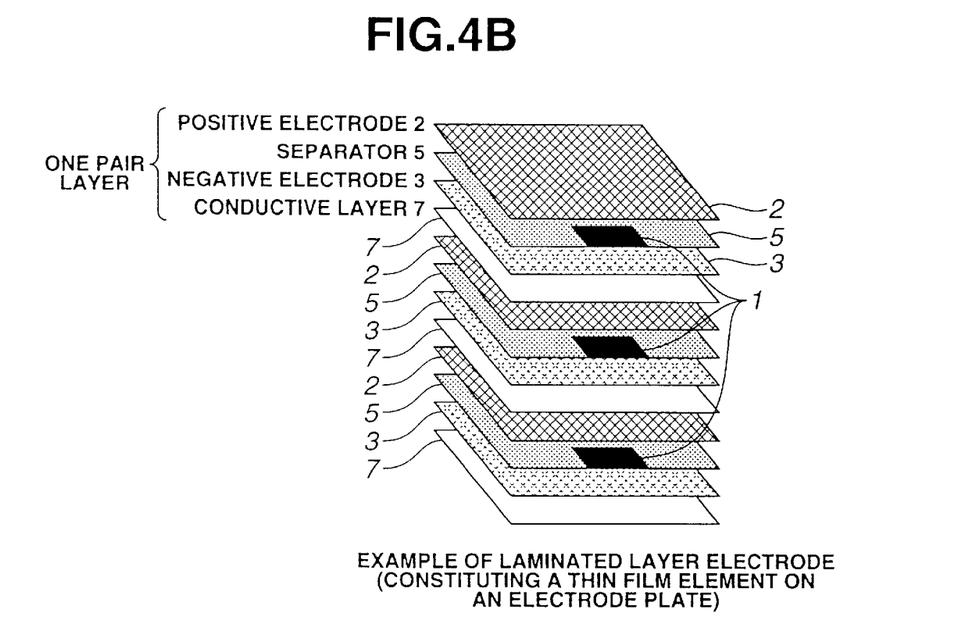

FIGS. 4A and 4B show a fourth preferred embodiment of the state sensing apparatus for a multi-cell battery, the battery including the positive electrode 2, the negative electrode 3, and the separator 5. In the fourth embodiment, each unit cell is laminated as the multi-cell structure.

A solid-state or gel ion conductor such as a highly molecular ion conductor may be used in place of a solvent electrolyte. The light emitting device 1 for each unit cell emits the light beams as in the same way as described in the second embodiment in a case where a certain prescribed voltage is applied to each light emitting device 1.

As described hereinabove, since, in the battery state sensing apparatus in each of the first, second, third, and fourth preferred embodiments according to the present invention, the light emitting device or the luminescent element such as the luminescent semiconductor micro-crystals is installed or buried into the inner part of the separator of each cell or of the battery, a battery system with a state sensing function can be integrated with the battery in a single body. Especially, in a case of the fourth embodiment in which a multiple number of cells are laminated or a bipolar battery is structured, it is difficult to install the lead wires to be connected to the semiconductor device, the fixing portions of the electrodes to which the lead wires are connected, and the semiconductor device concentratedly at a narrow space. However, the battery state sensing apparatus in each of the first through fourth embodiments can solve inherently the above-described problem.

(Fifth Embodiment)

FIGS. 5A, 5B, 6A, and 6C show a fifth preferred embodiment of the state sensing apparatus according to the present invention.

Figure 5A:
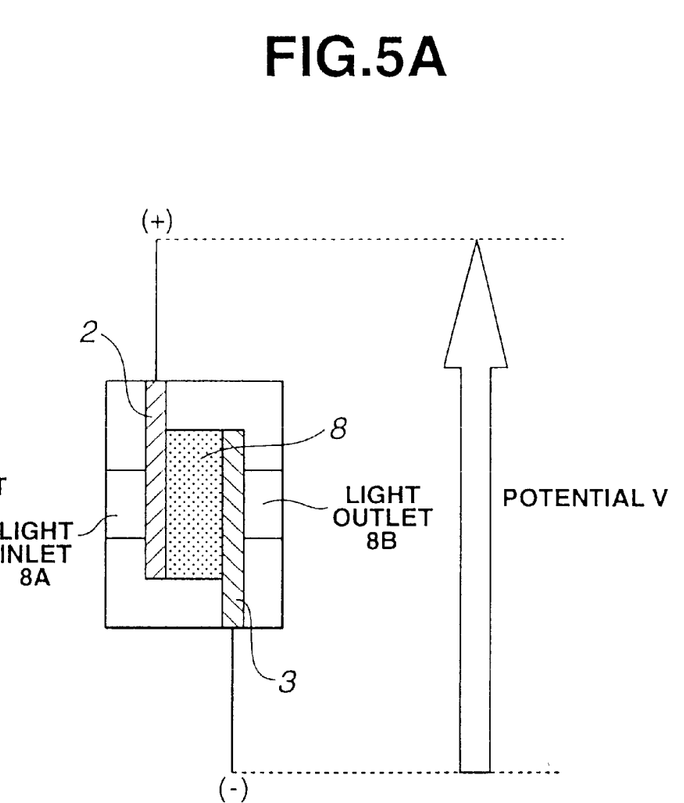
FIGS. 5A, 5B, 6A, and 6B are explanatory views of the battery state sensing apparatus in a fifth preferred embodiment for explaining an operation of the battery state sensing apparatus of the fifth preferred embodiment.
Figure 5B:
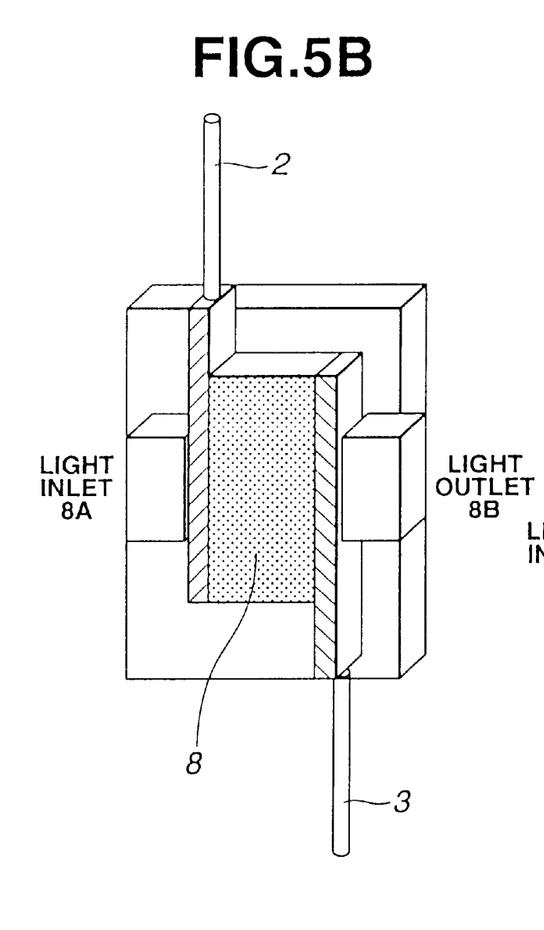
Figure 6A:
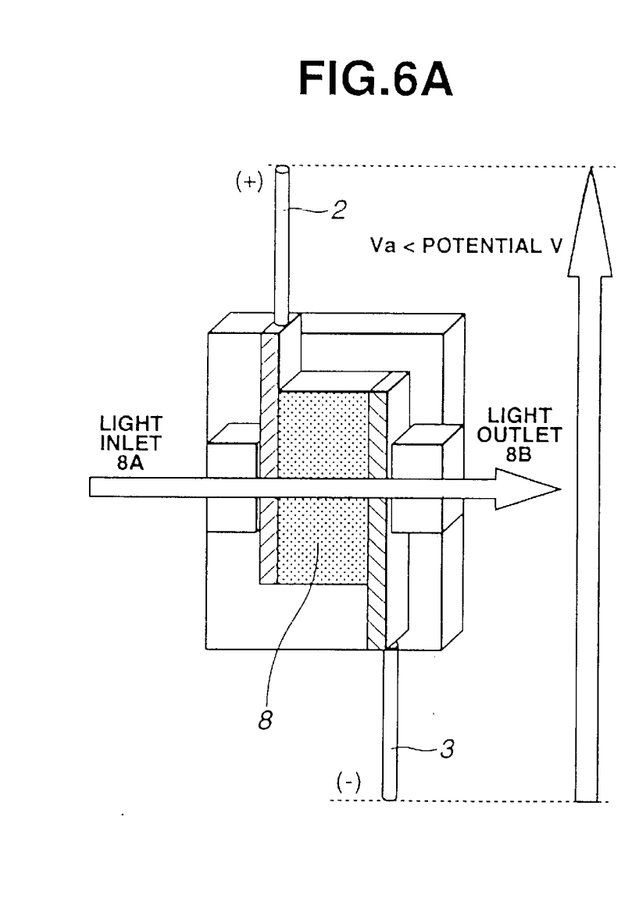
Figure 6B:
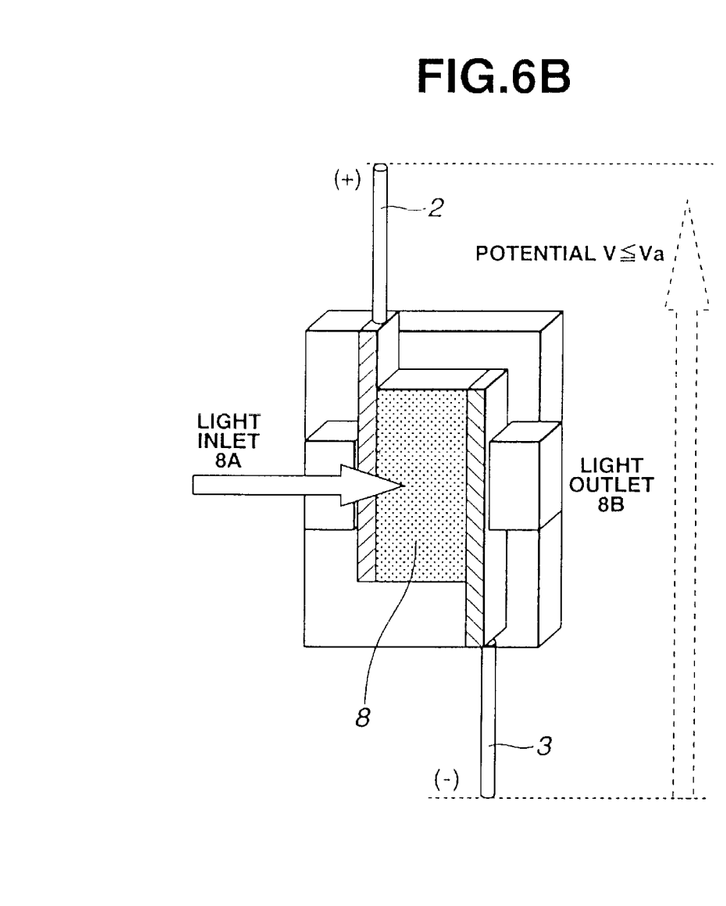

As typically shown in FIG. 5A, a liquid crystal cell (or liquid crystal device 8) is provided with electrodes, a liquid crystal material, a light introducing window (light inlet) 8A, and a light outlet window 8B (light outlet).

When the electrodes are faced with each other and a certain voltage is applied to both electrodes, an orientation of a liquid crystal of the liquid crystal device 8 is varied in accordance with the applied voltage so that a light introduced shuttering characteristic of the liquid crystal is varied. By sensing the transparent light, a detection of the magnitude of the applied voltage is, on the contrary, carried out.

When the voltage is applied across the electrodes of the liquid crystal device (LCD) 8, the liquid crystal device 8 is selected such that the light is not transmitted (or shuttered) due to the orientation of the liquid crystal when the applied voltage V is, for example, equal to or lower than Va=1.8 volts and is transmitted when the applied voltage is lower than 1.8 volts.

The electrodes of the liquid crystal device are connected in parallel to the lithium ion battery as typically shown in FIG. 5A.

Figure 7:
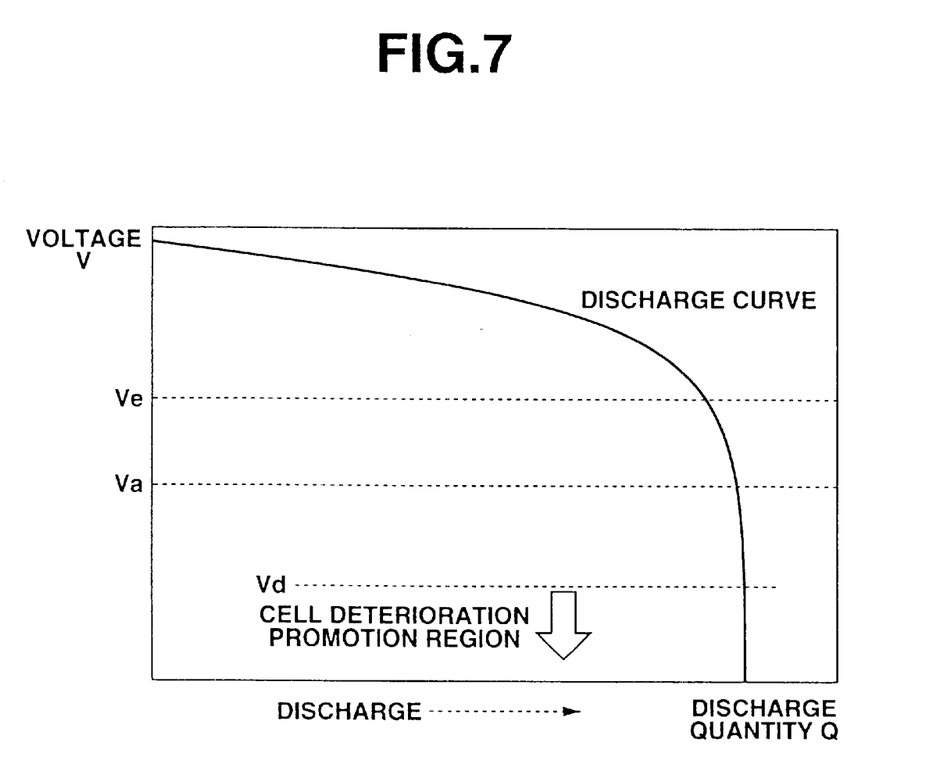
FIG. 7 is a characteristic graph representing a discharge curve of the cell to which the battery state sensing apparatus according to the present invention is applicable.

FIG. 7 shows a discharge curve of the battery used in the fifth embodiment.

In FIG. 7, a longitudinal axis denotes a battery terminal voltage and a lateral axis denotes a discharge quantity. A voltage Ve shown in FIG. 7 denotes a prescribed discharge terminating voltage in an operation mode presumed in the battery system shown in FIGS. 5A through 6B. The discharge terminating voltage means a voltage prescribed that the discharge of the battery is stopped at a time point at which the applied voltage has arrived. The voltage Va is a voltage at which the liquid crystal composition is oriented (or twisted) to change a light-transmissive (or light transparent) characteristic.

If the liquid crystal device 8 is used to sense the excessive discharge, the voltage Va is usually set to be lower than the voltage Ve.

If a voltage promoting deterioration of the battery is Vd volt, the above-described voltage Va at which the orientation of the liquid crystal is varied is set to be higher than the voltage Vd.

If, as described above, the voltage Va is set and the applied voltage becomes lower than the voltage Va, the orientation of the liquid crystal composition of the liquid crystal device 8 is changed so that the introduced light cannot be transmitted through the liquid crystal device 8.

If a light shielding (shuttering) effect of the liquid crystal device 8 is sensed with the photo sensor 4, the battery state sensing apparatus can prevent such a phenomenon that the discharge of the battery is continued with time so that the battery falls in an excessive discharge region such as to cause, for example, a deterioration of the battery.

(Sixth Embodiment)

Figure 8:
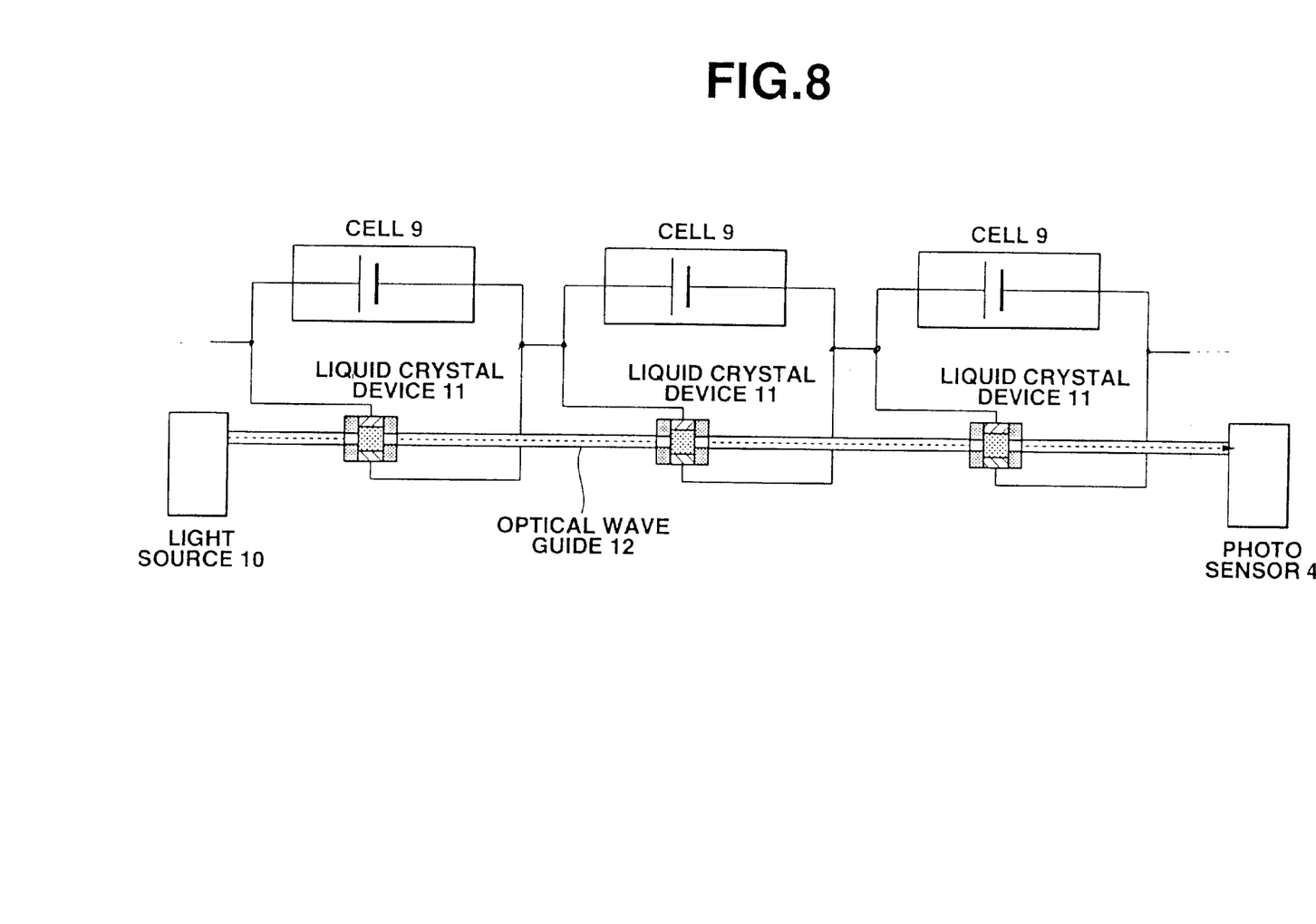
FIG. 8 is an explanatory connection diagram of a cell group of the cells connected in series with each other to which the battery state sensing apparatus in a sixth preferred embodiment according to the present invention is applicable.

FIG. 8 shows a sixth preferred embodiment of the battery state sensing apparatus according to the present invention applicable to a cell group system.

As shown in FIG. 8, a couple of light source 10 and photo sensor 4 are prepared by connecting light tranmitting portions of respective liquid crystal devices 11 via such an optical wave guide 12 as an optical fiber, the respective liquid crystal devices 11 being connected in parallel to corresponding batteries (,i.e., connected across positive and negative electrodes of the corresponding battery).

If any one of the cells 9 in the cell group performs discharge excessively, the state sensing apparatus can sense its excessive discharge state, can maintain its insulating characteristic, and can provide a simple system configuration.

If a charge residual quantity is sufficient as the group battery and any cell 9 is charged with the prescribed voltage Va or higher, the light from the light source 10 becomes incident on the photo sensor 4 optically connected to one end of the optical fiber (optical wave guide) 12 without interruption (or shutter) by any liquid crystal device 11 connected in parallel to the corresponding cell 9.

On the contrary, it is presumed that the voltage of any cell 9 would be reduced at a discharge terminating period of the cell group. In details, if the voltage of any cell 9 is reduced and becomes equal to or lower than the prescribed voltage Va, the corresponding liquid crystal device 11 connected in parallel thereto does not transmit the light but interrupt the light source 10 cannot arrive at the end terminal of the optical fiber 12 at which the photo sensor 4 is installed.

The battery state sensing apparatus in the sixth embodiment described above can assuredly sense the voltage of any cell 9 which becomes equal to or lower than the prescribed voltage Va.

As described above, if the liquid crystal device with less power consumption of the battery to be sensed is used to sense the state of the cell group, the battery state sensing apparatus can be carried out without large consumption of battery energy. In the sixth embodiment, the state of the battery is the excessive discharge state of the battery (the multi-cell structure) without consumption of the residual energy in each cell 9.

(Seventh Embodiment)

Figure 9A:
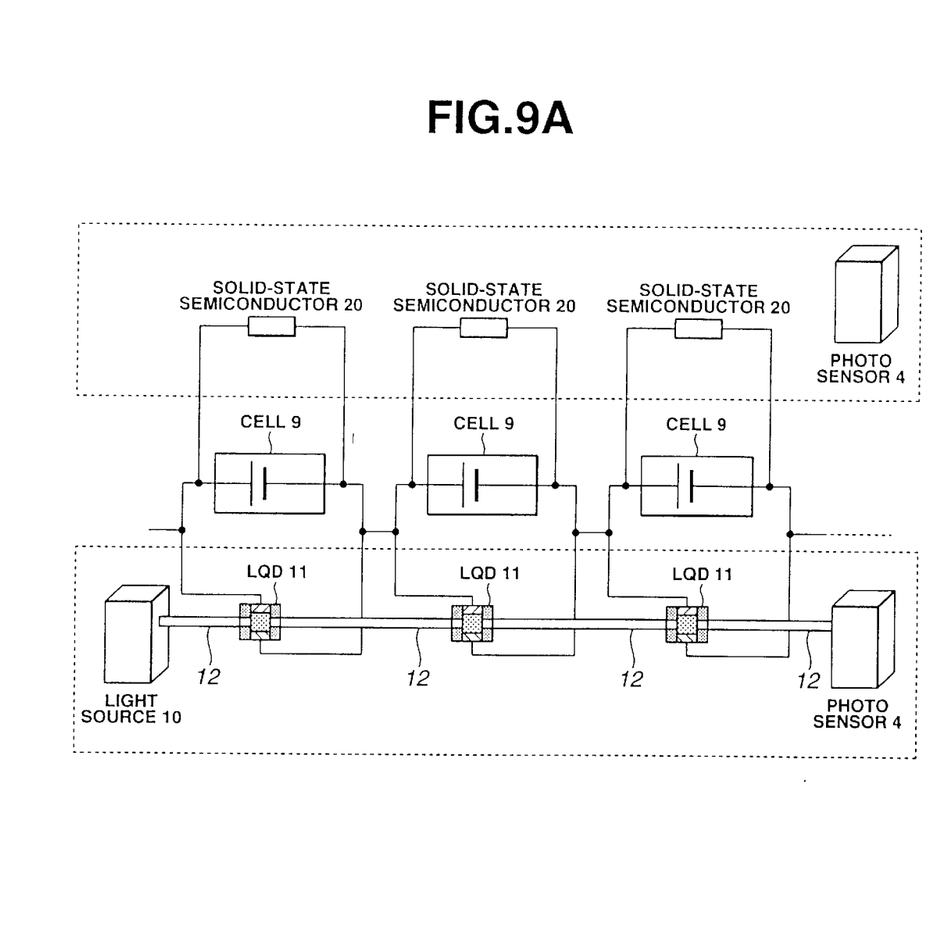
FIG. 9A is an explanatory connection diagram of the cell group of the cells connected in series with each other to which the battery state sensing apparatus in a seventh preferred embodiment according to the present invention is applicable.
Figure 10:
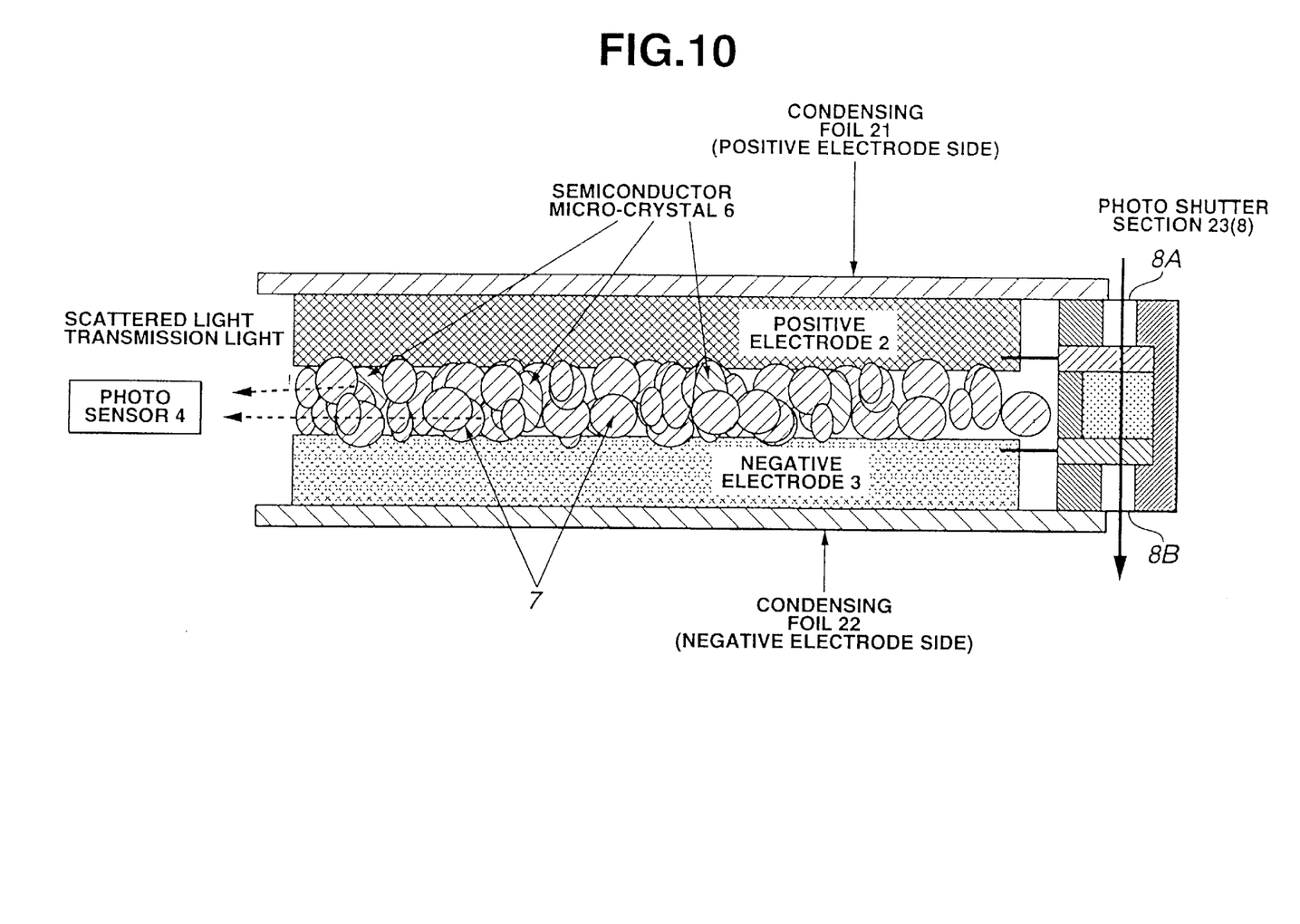
FIG. 10 is an explanatory cross sectional view of the cell of the cell group to which same components of the battery state sensing apparatus shown in FIG. 9A is applied.

FIGS. 9A and 10 show a seventh preferred embodiment of the battery state sensing apparatus according to the present invention.

As shown in FIG. 10, a photo shutter section 23, viz., the liquid crystal device 8, e.g., described in the fifth embodiment is connected in parallel to each cell 9 in such a manner that one electrode thereof is coupled to the positive electrode 2 of each cell and the other electrode thereof is coupled to the negative electrode 3 of each cell, the light inlet window 8A and light outlet window 8B being provided.

A condensing foil 21 is adhered onto part of an upper surface except the light inlet window. Another condensing foil 22 is adhered onto part of a lower surface except the light outlet window 8B of the liquid crystal device, viz., the light shutter section 23. The internal structure of each cell of the cell group is the same as that of the second embodiment shown in FIG. 3.

That is to say, the seventh embodiment is a combination of the sixth embodiment with the second embodiment. Therefore, both of the excessive charge and the excessive discharge states of the cell group, viz., the battery (multi-cell structure) can be sensed, as appreciated from FIG. 9A.

It is noted that each cell 9 is connected in series with one another to form the battery in the case of FIG. 9A.

Figure 9B:
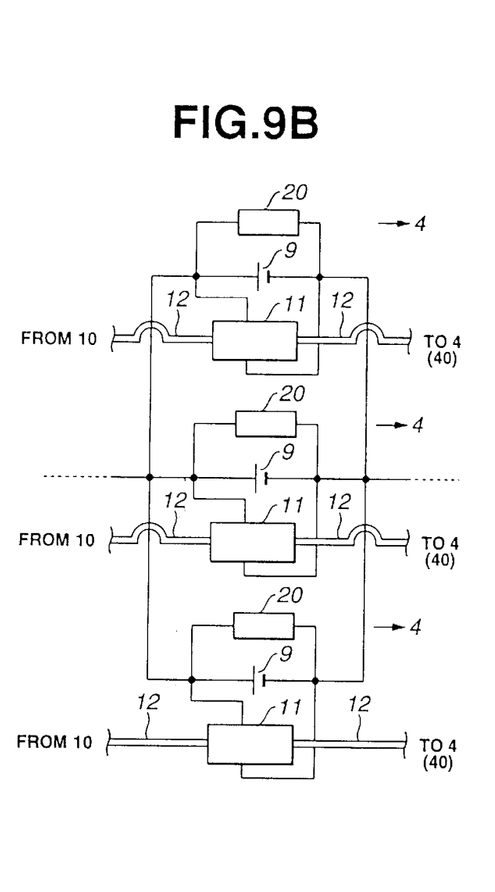
FIG. 9B is an explanatory connection diagram of the cell group of the cells connected in parallel to each other to which an alternative of the battery state sensing apparatus in the seventh preferred embodiment shown in FIGS. 9A and 10 is applicable.

FIG. 9B shows an alternative of the seventh preferred embodiment of the battery state sensing apparatus.

As shown in FIG. 9B, each cell 9 is connected in parallel to one another to form the cell group. In this alternative case, both excessive charge and discharge states of the cell group can be sensed as in the same way as in the seventh embodiment. In the case of FIG. 9B, a light superposing section 40 to superpose the light from the respective liquid crystal devices (LQD) 11 is needed in the optical wave guide 12 before the photo sensor 4.

In each preferred embodiment, the cell is a solid-state cell whose ion conductive portion (layer) is made of either a high molecular conductive material or inorganic ion conductor (conductive material), the battery is a lithium ion secondary battery in which a lithium ion is used as medium transporting positive charges, the positive electrode of the cell is made of $LiMnO_2$ (Lithium Manganese Dioxide), and the negative electrode of the cell is made of hard carbon.

It is noted that the light emitting device specifically includes the light emitting diode and the voltage-responsive optical sensing device means, so-called, an electro-optical device such as the light emitting device and the liquid crystal device.

The contents of Japanese Patent Applications No. 2000-058077 filed in Japan on Mar. 3, 2000 and No. 2000-058078 filed in Japan on Mar. 3, 2000 are herein incorporated by reference. Although the invention has been described above by reference to certain embodiment of the invention, the invention is not limited to the embodiments described above. Modifications and variations of the embodiments described above will occur to those skilled in the art in the light of the above teachings.

The scope of the invention is defined with reference to the following claims.

What is claimed is:

1. An apparatus for sensing a state of a battery, the apparatus comprising:
   a voltage-responsive optical sensing device having an optical characteristic that changes in response to a variation in a voltage across positive and negative electrodes of a cell constituting the battery; and
   a state sensing system that senses a change in the optical characteristic of the voltage-responsive optical sensing device to sense the state of the battery.

2. An apparatus for sensing a state of a battery as claimed in claim 1, wherein the state of the battery is a state of excessive charge of the cell and the voltage-responsive optical sensing device changes its optical characteristic when the voltage thereacross has reached to a predetermined prescribed voltage.

3. An apparatus for sensing a state of a battery as claimed in claim 2, wherein the state sensing system comprises a photo sensor to sense the state of the excessive charge of the battery by sensing a light beam emitted from the voltage-responsive optical sensing device.

4. An apparatus for sensing a state of a battery as claimed in claim 3, wherein the voltage-responsive optical sensing device comprises a light emitting device interposed between the positive and negative electrodes of the cell to emit the light beam when the voltage thereacross has reached to the predetermined prescribed voltage.

5. An apparatus for sensing a state of a battery as claimed in claim 4, wherein the light emitting device is disposed in a separator interposed between the positive and negative electrodes of the battery and the light emitting device comprises a first portion exposed to a surface faced toward the positive electrode of the cell and contacted on the positive electrode thereof and a second portion exposed to a surface faced toward the negative electrode of the cell and contacted on the negative electrode thereof.

6. An apparatus for sensing a state of a battery as claimed in claim 5, wherein the light emitting device is a semiconductor device disposed in a hole formed in the separator to emit the light beam when an applied voltage thereto is equal to or larger than the predetermined prescribed voltage and to signal the state of the excessive charge of the battery and simultaneously discharge the cell by emitting the light beam when the voltage across the positive and negative electrodes of the cell has reached to the predetermined prescribed voltage.

7. An apparatus for sensing a state of a battery as claimed in claim 5, wherein the separator is transmissive to the light beam emitted from the light emitting device and the separator transmits the light beam from the light emitting device to an end of the separator.

8. An apparatus for sensing a state of a battery as claimed in claim 5, wherein the light emitting device is disposed in a through hole formed in the separator and the first portion of the light emitting device is a positive electrode of the light emitting device and a second portion thereof is a negative electrode of the light emitting device.

9. An apparatus for sensing a state of a battery as claimed in claim 5, wherein the light emitting device comprises luminescent semiconductor micro-crystals embedded in the separator.

10. An apparatus for sensing a state of a battery as claimed in claim 5, wherein the battery is a multi-cell structure and each cell comprises the light emitting device, the light emitting device being disposed in a separator interposed between the positive and negative electrodes of the cell and comprising a first portion exposed to a surface faced toward the positive electrode of the cell and contacted on the same positive electrode thereof and a second portion exposed to a surface faced toward the negative electrode of the cell and contacted on the same negative electrode thereof.

11. An apparatus for sensing a state of a battery as claimed in claim 1, wherein the cell is a solid-state cell whose ion conductive portion is made of a high molecular conductive material or inorganic ion conductor.

12. An apparatus for sensing a state of a battery as claimed in claim 11, wherein the battery is a lithium ion battery in which a lithium ion is used as a medium transporting positive charges.

13. An apparatus for sensing a state of a battery as claimed in claim 12, wherein the light emitting device comprises a semiconductor device having a high electrolytic solution resistant characteristic and made of a nitride selected from the group consisting of GaN, AlN, and SiN.

14. An apparatus for sensing a state of a battery as claimed in claim 1, wherein the positive electrode of the cell is made of $LiMnO_2$.

15. An apparatus for sensing a state of a battery as claimed in claim 14, wherein the negative electrode of the cell is made of hard carbon.

16. An apparatus for sensing a state of a battery as claimed in claim 15, wherein the semiconductor device is disposed in a partial defect of a light-reflective thin film portion of the separator, the light-reflective thin film portion being formed by a thermal compression of the separator.

17. An apparatus for sensing a state of a battery as claimed in claim 15, wherein the light-reflective thin film portion is interposed between the positive electrode and the separator and the separator and the negative electrode, respectively.

18. An apparatus for sensing a state of a battery as claimed in claim 1, wherein the voltage-responsive optical sensing device comprises a liquid crystal device which changes its light transmissive characteristic in response to the voltage across the positive and negative electrodes of the cell and whose electrodes are connected in parallel to the cell and the state sensing system comprises an external light source from which a light beam is introduced into the liquid crystal device and a photo sensor to sense a presence of a transmitted light from the liquid crystal device.

19. An apparatus for sensing a state of a battery as claimed in claim 18, wherein the liquid crystal device has a light shuttering characteristic when the voltage (b) across the positive and negative electrodes of the cell falls in a predetermined range of a $(V) \leq b (V) \leq c (V)$, wherein a and c denote predetermined prescribed voltages and has the light transmissive characteristic when the voltage (b) falls out of the predetermined range.

20. An apparatus for sensing a state of a battery as claimed in claim 18, wherein the liquid crystal device has the light transmissive characteristic when the voltage (e) across the positive and negative electrodes of the cell falls in a predetermined range of d $(V) \leq e (V) \leq f (V)$, wherein d and f denote predetermined prescribed voltages and has a light shuttering characteristic when the voltage (e) falls out of the predetermined range.

21. An apparatus for sensing a state of a battery as claimed in claim 18, wherein the cell is one of a group of multiple number of cells, each cell being connected in series with one another and the liquid crystal device being connected in parallel to the corresponding cell of the cell group and wherein the state sensing system further comprises an optical wave guide which passes through a light transmissible portion of each of the liquid crystal devices and the photo sensor senses a quantity of the transmitted light beams to sense the state of the cell group.

22. An apparatus for sensing a state of a battery as claimed in claim 18, wherein the cell is one of a group of multiple number of cells to form the battery, each cell being connected in parallel to one another and the liquid crystal device being connected in parallel to the corresponding cell of the cell group and the photo sensing system further comprises a plurality of optical wave guides, each optical wave guide passing through a light transmissive portion of the corresponding liquid crystal device, a superposing portion to superpose the transmitted light beams, and the photo sensor to sense the quantity of the transmitted light beams superposed in the superposing portion to sense the state of the cell group.

23. An apparatus for sensing a state of a battery as claimed in claim 22, wherein the optical wave guide comprises an optical fiber.

24. An apparatus for sensing a state of a battery as claimed in claim 22, wherein the state of the battery is a state of an excessive discharge quantity of the cell and wherein a=0 V and c=2 V±1V.

25. An apparatus for sensing a state of a battery as claimed in claim 21, wherein the light emitting device is connected across the positive and negative electrodes of each cell of the cell group and another photo sensor is disposed to sense the light beam from each of the light emitting devices to sense the state of the cell group.

26. An apparatus for sensing a state of a battery as claimed in claim 22, wherein the light emitting device is connected across the positive and negative electrodes of each cell of the cell group and another photo sensor is disposed to sense the light beam from each of the light emitting devices to sense the state of the cell group.

* * * * *